(12) United States Patent  
Kohmaescher

(10) Patent No.: US 9,533,670 B2  
(45) Date of Patent: Jan. 3, 2017

(54) METHOD FOR ENGAGEMENT AND DISENGAGEMENT

(71) Applicant: Danfoss Power Solutions Inc., Ames, IA (US)

(72) Inventor: Torsten Kohmaescher, Hamburg (DE)

(73) Assignee: Danfoss Power Solutions Inc., Ames, IA (US)

( * ) Notice: Subject to any disclaimer, the term of this patent is extended or adjusted under 35 U.S.C. 154(b) by 218 days.

(21) Appl. No.: 14/456,232

(22) Filed: Aug. 11, 2014

(65) Prior Publication Data

US 2015/0057899 A1    Feb. 26, 2015

(30) Foreign Application Priority Data

Aug. 23, 2013 (DE) ................... 10 2013 216 850

(51) Int. Cl.
  *B60W 10/04* (2006.01)
  *B60W 10/10* (2012.01)
  (Continued)

(52) U.S. Cl.
  CPC .............. *B60W 10/04* (2013.01); *B60W 10/10* (2013.01); *B60W 10/103* (2013.01);
  (Continued)

(58) Field of Classification Search
  None
  See application file for complete search history.

(56) References Cited

U.S. PATENT DOCUMENTS 4,096,768 A * 6/1978 Miyao ..................... F16H 47/04  
  475/76  
4,100,822 A * 7/1978 Rosman .................. B61B 12/10  
  104/178

(Continued)

FOREIGN PATENT DOCUMENTS

DE    1555247 C3    3/1978  
DE    4307616 C2    6/1996

*Primary Examiner* — Edwin A Young  
(74) *Attorney, Agent, or Firm* — Zarley Law Firm, P.L.C.

(57) ABSTRACT

Method for engaging and disengaging a hydraulic motor which is adjustable in its displacement from and to a hydrostatic drive train of a hydromechanical transmission with a closed hydraulic fluid circuit. Two adjustable hydraulic motors and a hydraulic pump are arranged in parallel in the hydrostatic drive train and connected to a mechanical drive on the output side. At least one of the two hydraulic motors is connected to the mechanical drive via an assigned clutch. As appropriate to the driving situation, during operation of the other hydraulic motor and the hydraulic pump at least one of the hydraulic motors is engaged via the assigned clutch with the hydromechanical transmission from which the hydraulic motor was previously disengaged, likewise as appropriate to the driving situation. Before closing the clutch, the hydraulic motor to be engaged is accelerated load-free by deflecting its adjustment device in such a way that the rotational speed of an assigned clutch input shaft of the clutch is at least equal to the rotational speed of the clutch output shaft of the clutch which is connected to the mechanical gear. When the clutch is closed, both hydraulic motors act on a common output shaft of the mechanical gear.

13 Claims, 7 Drawing Sheets

(51) Int. Cl.
*F16H 47/02* (2006.01)
*B60W 10/103* (2012.01)
*B60W 10/111* (2012.01)
*F16H 61/421* (2010.01)
*F16H 61/444* (2010.01)
*F16H 61/47* (2010.01)

(52) U.S. Cl.
CPC ........... *B60W 10/111* (2013.01); *F16H 47/02* (2013.01); *F16H 61/421* (2013.01); *F16H 61/444* (2013.01); *F16H 61/47* (2013.01); *B60Y 2300/73* (2013.01); *Y10T 477/631* (2015.01)

(56) References Cited

U.S. PATENT DOCUMENTS

2008/0280719 A1* 11/2008 Heindl ................. B60K 17/356
                                                        475/205
2009/0045003 A1* 2/2009 Shirao .................... F16H 47/04
                                                        180/338

* cited by examiner

METHOD FOR ENGAGEMENT AND DISENGAGEMENT

BACKGROUND OF THE INVENTION

The invention concerns a method for operating a hydromechanical transmission with a hydrostatic drive comprising a closed hydraulic circuit. At least an adjustable hydraulic pump, a hydraulic fixed displacement motor and an adjustable hydraulic motor are arranged in the closed hydraulic circuit, preferably however two adjustable hydraulic motors. In particular, this invention concerns a method for the continuously variable adjustment of the transmission of a hydromechanical drive in vehicles, construction devices, industrial trucks or lifting devices. These and similar machines with hydrostatic drives will be referred to in the following as work machines, as used in construction or in agriculture and forestry.

The hydromechanical drives relating to the invention designed for work machines have in common that they require a high level of torque at the output shaft of the hydromechanical drive (=high tractive force), for example in order to perform a specific work function such as lifting or transporting loads, while the torque can be lower to perform a simple, fast driving function, for example when moving the work machine. However, the rotational speed of the output shaft of the hydromechanical drive should be high for fast movement or driving so as to allow the work machine to achieve as high a speed as possible. In both cases, possible driving speeds and tractive forces are limited by the power which can be provided by the driving motor, e.g. a diesel engine.

According to the state of the art, two fundamental possibilities are proposed which involve either the arrangement/implementation of intermediate gears or the arrangement of several hydraulic motors which are connected in parallel in the hydrostatic section. In the case of using intermediate gears and only one hydraulic motor, the conversion range for the torque and the rotational speed at constant hydrostatic power must largely be covered by the intermediate transmission. The high speed increase and reduction ratio required in intermediate gears is often complex and elaborate to implement may not always be feasible, depending on the installation space available. What is more, intermediate gears often consume energy to rotate shafts and cog wheels which do not serve to drive the work machine in all operating states but which are inherent to their construction. Intermediate gears are usually heavy and therefore slow in their response to changes in an operating state or in the required torque or rotational speed at the output or input shaft. For example in a two-gear manual transmission, a high level of tractive force is provided by one gear and a high driving speed by the other gear. In most cases, however, the change of gear results in a loss of power and/or comfort, but will at least cause an interruption in tractive power. If a change of gear is to be effected, the vehicle has to be put into a running state in which such a mechanical change of gear is possible. In the case of jaw clutches in particular, the vehicle may even have to be brought to a halt for this purpose. At the least there will be an interruption in tractive power when a mechanical change of gear is carried out.

In the second approach known in the state of the art using a parallel arrangement of hydraulic motors for connection and disconnection, the problem of bulky, heavy and often complex and unwieldy intermediate gears is avoided in that hydraulic force is to be provided flexibly to the hydrostatic drive by means of the connection and disconnection of hydraulic motors. This results in a very large conversion range in terms of the band of rotational speed and torque available to drive the work machine. In addition, the hydromechanical system as a whole can be operated within a better efficiency range when the connection and disconnection for the hydraulic machines does not occur within ranges where the latter demonstrate a low level of efficiency or a high level of power dissipation.

DE 15 55 247 C3 describes a control unit for a continuously variable hydrostatic drive of a motor vehicle, in which one of two adjustable hydraulic motors is deactivated when a maximum rotational speed is reached at the output shaft of the hydromechanical transmission during acceleration, for example of a work machine. The proposal is here is to implement the deactivation of the hydraulic motor at a displacement greater than zero of the hydraulic motor to be deactivated in order to ensure impact-free disengagement. DE 15 55 247 C3 further proposes that the hydraulic motor intended for deactivation purposes comprises a wobble plate/adjustment device that is continuously reduced in its deflection angle as the rotational speed of the output shaft is increased and which is promptly reset to zero when a deflection angle of approximately four degrees is reached, at the same time reducing the delivery volume of the hydraulic pump by the amount exhibited by the displacement flow of the hydraulic motor to be deactivated at a deflection angle of four degrees. The effect of this is that the hydraulic motor to be deactivated does not move into high rotational speed ranges and rotational speed differences do not arise as compared to the output/input shaft, or that the hydraulic motor still in operation undergoes a sudden increase in rotational speed by absorbing the delivery flow of the hydraulic pump since the latter is already/still fully deflected. For the purpose of a further reduction in speed—corresponding to an increase in rotational speed at the output shaft of the hydromechanical transmission—the delivery volume of the hydraulic pump is initially increased once again until the hydraulic pump is fully deflected. After this, a further increase in speed/rotational speed can only be achieved by decreasing the displacement of the hydraulic motor remaining in the drive, for which purpose this hydraulic motor must of course likewise be adjustable.

DE 43 07 616 C2 draws on the method for deactivating or disengaging a hydraulic motor from a hydrostatic drive as described in DE 15 55 247 C3 and proposes in addition that the deactivated hydraulic motor should be braked by means of a mechanical brake. According to DE 43 07 616 C2 this is a measure to prevent the motor from continuing to rotate without load or from exceeding a maximum rotational speed permitted for the hydraulic motor.

For the (renewed) connection or engagement of an adjustable hydraulic motor when reducing driving speed, i.e. when reducing the rotational speed of the output shaft of the mechanical drive, the state of the art proposes that the operational steps for deactivating or disengaging should be performed in the reverse order. In other words, the state of the art proposes connecting or engaging a hydraulic motor at standstill to the hydrostatic drive train that is under load. In this way, the latter is suddenly "pulled into action" by the assigned rotating clutch shaft connected to the mechanical drive (intermediate gear) because the clutch shaft is driven by the other hydraulic motor under load via the intermediate gear. This places a high level of stress not only on the clutch but also on the components of the hydraulic motor to be connected, as well as on the other hydraulic motor remaining in the drive. What is more, the jerking activation of the other hydraulic motor can be felt when operating the work machine.

According to the state of the art, the engaging hydraulic motor is accelerated suddenly from standstill to the rotational speed equal to that of the clutch output shaft, causing an engagement operation which has a sudden impact or is at least of a jerking nature, an effect which can at best be dampened by the use of multi-plate clutches, for example. What is more, the forces of inertia that occur when the hydraulic motor is accelerated are transmitted to the intermediate gear by the clutch forces, and this is felt in the operation of the work machine as a jerk. In order to achieve minimum interventional impact when connecting an additional hydraulic motor to a hydrostatic drive train according to the method proposed by the state of the art, the rotational speed of the assigned clutch shaft must be as low as possible so as to avoid high differences in rotational speed and therefore high forces of inertia between the clutch shaft and the hydraulic motor to be connected.

The object of this invention is therefore to provide a method for the engagement/disengagement of a hydraulic motor to and from a hydrostatic drive train with at least one hydraulic pump and two other hydraulic motors, of which at least one can be connected to or disconnected from a hydromechanical drive train, whereby both the disengagement and engagement operations are impact-free, jerk-free and avoid material stress. At the same time, the method is to be capable of being executed simply and without elaborate technical aids, nor should it incur high costs in terms of technical implementation.

The object is achieved by means of the method according to the invention as described in claim 1, whereby the claims dependent on claim 1 specify other preferred embodiments of the method according to the invention. In the subordinate claim, a control device is claimed with a computer program to execute the method.

SUMMARY OF THE INVENTION

The method according to the invention for disengaging and engaging a hydraulic motor which is adjustable in its displacement by deflection of an adjustable device—the hydraulic motor forming part of a hydraulic drive train with a closed hydraulic circuit—is applied to hydromechanical drives comprising at least one hydraulic pump and at least two hydraulic motors, of which one is adjustable and can be disconnected from and (re-)connected to the drive. All the hydraulic machines arranged in the hydrostatic drive train are connected to each other hydraulically in parallel. The hydraulic motors, of which there are at least two, are preferably connected to a shared mechanical drive or intermediate gear. The hydraulic motor to be disconnected and connected or disengaged and engaged, of which there is at least one, is connected to the shared mechanical drive by means of a clutch, for example. When the clutch is closed, therefore, at least two hydraulic motors act on the shared mechanical drive, which is in turn connected to the travel drive of a work machine.

The invention is explained in the following based on a hydrostatic travel drive but is not limited to this application. Other embodiments of a hydrostatic drive with a hydromechanical transmission, for example for lifting and transporting loads, are likewise covered by the inventive concept, as are all other conceivable work machines which in addition to a work mode for transferring high forces also exhibit a fast gear for moving the work machine, for example.

Normally the two hydraulic motors are engaged when a work machine is at standstill and provide a relatively high level of torque to accelerate the work machine when it is setting off in that their adjustment devices are preferably fully deflected. At this point the hydraulic motors involved each demonstrate their highest displacement. For the purpose of acceleration from standstill, the displacement of the hydraulic pump—starting from a deflection angle of approximately 0°—is continuously increased, whereby the hydraulic motors begin to rotate when a minimum operating pressure is provided by the supply pump. The further the hydraulic pump is deflected, the greater the delivery volume and therefore the higher rotational speed of the hydraulic motors, since their displacement initially remains constantly set at maximum level. The hydraulic pump achieves its maximum delivery volume, for example, at a specified constant rotational speed of a combustion engine as prime mover with complete deflection, whereby the hydraulic pump simultaneously generates the maximum operating pressure at the given level of drive power of a combustion engine or electric motor. In order to further increase the rotational speed at the output shaft of the hydromechanical drive, the adjustment devices of the hydraulic motors, having been set to maximum deflection angles for setting off, for example, are continuously reduced, thereby increasing the rotational speed of the individual hydraulic motors while the delivery volume of the hydraulic pump remains constant.

As the rotational speed of the hydraulic motors increases and their displacement decreases, however, the torque provided by the hydraulic motors is also reduced, with system pressure remaining the same since it is limited by the drive power. In this way as the driving speed of the work machine increases, the amount of torque available constantly decreases. In order to prevent the hydraulic motor from over-rotating as the deflection angle is further decreased and to prevent the hydromechanical system as a whole from operating within a low efficiency range, the hydraulic motor concerned—usually the hydraulic motor with the larger stroke volume—is disengaged from the hydrostatic drive.

As is well known, the efficiency of a hydraulic motor initially increases with increasing rotational speed, starting from standstill, and then decreases after a maximum level is reached as the rotational speed continues to increase. The decrease in efficiency at high rotational speeds is relatively fast in large-volume hydraulic motors in particular since large-volume hydraulic motors usually exhibit high moving masses, a feature inherent in their design due to larger bearings, a larger cylinder block, etc. In small-volume hydraulic motors, the decrease in efficiency is more even than in large-volume hydraulic motors in relation to the increase in rotational speed. At a constant volume flow of hydraulic fluid and at an equally high level of torque to be delivered by the two hydraulic motors, a large-volume hydraulic motor must be set to a lesser deflection angle than a small-volume hydraulic motor, which means that the large-volume hydraulic motor is in a range which exhibits a lower level of efficiency. However, for driving operation alone, e.g. moving a work machine, the torque that can be generated by a relatively small-volume hydraulic motor is sufficient to further accelerate the work machine from a state in which it is already moving. The larger-volume hydraulic motor in a hydrostatic drive is therefore to be disengaged when a predefined speed of travel is reached, for example, so that the overall efficiency of the hydrostatic drive remains as high as possible.

For the purpose of disengagement, it is preferable for the adjustment device of the hydraulic motor to be disengaged to be suddenly set to zero when a definable limit value is reached, for example a limiting deflection angle, while at the same time the delivery flow of the hydraulic pump is reduced by an amount equal to the previously absorbed volume flow of the hydraulic motor to be disengaged at limiting angle position. The clutch for jerk-free disengagement of the (large-volume) hydraulic motor is then opened. At this moment the hydraulic motor is still rotating free of load and can be brought to standstill by means of a mechanical brake, for example. It is also conceivable for the hydraulic motor to be left to run out without being braked. The aim of this disengagement operation is to avoid the need for the limiting angle of the adjustment device of the disengaging hydraulic motor to be reduced excessively, thereby in particular avoiding excessive rotational speeds and an excessively low level of efficiency of the system as a whole, especially in the hydraulic motor to be disengaged. In this way it is possible to avoid damage to the hydraulic motor or premature wear and tear, for instance in the sealing devices of the hydraulic motor. It is also possible to avoid other damage to the hydraulic motor caused by excessively high centrifugal forces in that disengagement of the hydraulic motor from the hydrostatic drive occurs at a predefinable maximum rotational speed below a limiting rotational speed of the hydraulic motor and at a displacement greater than zero, thereby preventing avoidable stress to the hydraulic motor from occurring in the first place.

In order to further increase the rotational speed of the output shaft of a hydromechanical transmission, for example for the travel drive of a work machine, the delivery volume of the hydraulic pump is increased to a maximum that is equivalent to the rotational drive speed of the prime mover, with the hydraulic motor that remains in the drive continuing to exhibit maximum deflection. Here the construction type of the prime mover driving the hydraulic pump is immaterial. For example it could be a combustion engine, in particular a diesel engine, an electric motor or similar, whereby the driving motor itself should preferably be operated at optimum efficiency with a constant rotational speed. In order to further increase the rotational speed at the output shaft of the hydromechanical drive, however, it should be possible to increase the rotational speed of the prime mover until the maximum rotational speed of the driving motor has been reached, thereby achieving an associated increase in delivery volume with the hydraulic pump in a position of maximum deflection. The increase in delivery flow results in an increase in rotational speed of the hydraulic motor remaining in the drive, and therefore an increase in rotational speed of the output shaft of the hydromechanical transmission.

If a further increase in rotational speed is required at the output shaft of a hydromechanical transmission, this can be effected by reducing the displacement of the hydraulic motor remaining in the drive train. By reducing the displacement of the hydraulic motor—the output of the of the driving motor and thus of the delivery volume of the hydraulic pump remaining at a constant level—the rotational speed of the hydraulic motor increases as deflection is reduced, with the level of torque available also being reduced. The hydraulic output of the hydraulic motor is limited by the drive power which can be delivered by the driving motor. The rotational speed of the output shaft can only be increased up to the point at which the torque that can be supplied by the hydraulic motor is equal to the level required to maintain the rotational speed of the output shaft or at which the hydraulic motor remaining in the drive train has reached its rotational speed limit. When operated in travel drive, the motor vehicle/work machine has then reached its maximum speed.

In the case of the reverse operation, i.e. where the rotational speed of the output shaft of the hydromechanical drive is reduced, in other words when there is a reduction in the speed of a work machine after running at high speed, for example, such as at the start of a climb, the deflection of the (small-volume) hydraulic motor remaining in the hydrostatic drive is initially increased until full deflection is reached and therefore the maximum torque of the hydraulic motor is available. In order to increase torque further, the delivery volume of the hydraulic pump is further reduced so that the pressure in the hydraulic fluid circuit increases while the power delivered by the driving motor remains constant, which in hydraulic motors in this operating state, e.g. fully deflected, results in an increased supply of torque at a reduced rotational speed. If the delivery volume of the hydraulic pump is below a threshold level for economic, efficiency-optimized operation of the pump or the hydrostatic drive, it is expedient to reconnect the previously disconnected (large-volume) hydraulic motor. This threshold level is defined, for example, in that the pressure reaches maximum system pressure at a reduced volume flow. According to the state of the art, the connection of the hydraulic motor at standstill is effected in the reverse order of the disconnection of the hydraulic motor(s) as described previously According to the invention, however, the hydraulic motor at standstill that is to be engaged is initially accelerated briefly without load by means of brief deflection and back-deflection of its adjustment device. Here the method according to the invention accelerates it up to a rotational speed at least equal to the rotational speed at which the relevant clutch can be closed without damage at as low a difference in rotational speed as possible onto the clutch discs, ideally slip-free. Engagement of another hydraulic motor without impact or jerk is possible in particular if the clutch input shaft of the hydraulic motor to be engaged exhibits a rotational speed that is at least equal to the rotational speed of the corresponding clutch output shaft. When a corresponding rotational speed is reached by the hydraulic motor to be engaged in load-free acceleration, the clutch can be closed without the intervention impact being felt in the hydrostatic drive, since the rotational speeds on both sides of the clutch are approximately equivalent, thereby avoiding relative motion on both sides of the clutch. The forces of inertia that occur when accelerating the hydraulic motor were previously applied hydrostatically so that the clutch can be closed free of impact or jerking.

In order to accelerate the engaging hydraulic engine up to a synchronization speed at which a clutch can be closed as jerk-free as possible according to the invention, the control device of the engaging hydraulic motor is initially directed to a relatively low deflection angle in a load-free state when the system/operating pressure in the hydrostatic drive train comprising the pump and the first hydraulic motor is high enough to successfully and reproducibly accelerate the second hydraulic motor. By (slightly) shifting the adjustment device of the engaging hydraulic motor—still load-free—in the direction of a smaller deflection angle, the hydraulic motor is accelerated in spite of the fact that less torque can be generated, because only its inherent drag torque has to be overcome. The drag torque of the hydraulic motor is derived from the forces of inertia of the moving components of the hydraulic motor and the internal frictional forces generated. In order to achieve an initial start-up, the hydraulic motor should not be directed to an excessively large deflection angle so that the (first) hydraulic motor in operation is not impaired by absorbing the displacement of the engaging hydraulic motor. To compensate for the displacement required to start up the engaging hydraulic motor, the delivery volume of the hydraulic pump can be briefly increased. At the operating point of the hydrostatic drive train at which it is expedient to connect another hydraulic motor, the hydraulic pump of the hydrostatic drive train is not in its fully deflected position.

Once the connecting hydraulic motor in load-free state has reached an initial (predefined) start-up rotational speed which is lower than the synchronization speed required for engagement, the deflection of the adjustment device is directed back towards zero deflection so that the displacement of the hydraulic motor decreases. As the displacement decreases and the hydraulic pressure remains constant or increases, the hydraulic motor still generates a torque, thereby achieving a further increase in rotational speed which accelerates the still load-free hydraulic motor to at least synchronization speed or just above.

For the acceleration and engagement of a hydraulic motor according to the invention, therefore, a control device such as a control piston is subjected to a increasing signal for controlled deflection of the adjustment device of the hydraulic motor, whereby the signal causes the control device to increase the delivery volume and therefore the torque of the engaging hydraulic motor up to a point at which its drag torque is overcome and the engine can be accelerated load-free from standstill. When a start-up rotational speed is reached, the signal is reduced in a controlled manner until the hydraulic engine reaches the synchronization speed required for jerk-free engagement, at constant operating pressure. Meanwhile a control device preferably monitors the operating pressure of the hydrostatic drive and the rotational speed of the engaging hydraulic motor, controlling the peak-type signal for the adjustment of the deflection device of the hydraulic motor in order to deflect and back-deflect the adjustment device in a load-free state of the hydraulic motor.

In some cases it can occur that the hydraulic motor to be accelerated does not reach the start-up rotational speed by the time the control signal for deflection is withdrawn since the control signal may have been applied too briefly, the deflection angle set in response to the control signal was not large enough or the inner friction of the engine or its drag torque is higher than assumed. In such cases, a control signal can once again be created to direct the engaging hydraulic motor so as to further accelerate it. This is preferably effected when the control device has determined an insufficient start-up rotational speed after the control signal has been withdrawn. In this way the hydraulic motor to be engaged can be increased to the required start-up rotational speed so that it at least reaches the synchronization speed required to close the clutch when the deflection angle is subsequently returned.

The case may also occur that, after being directed to a deflection angle smaller than the maximum deflection angle, the hydraulic motor to be accelerated reaches its start-up rotational speed but does not reach the required synchronization speed when its deflection angle and therefore its displacement are returned to zero or almost zero. Here again the engaging hydraulic motor can be further accelerated by being directed once again to a predefined deflection angle by means of another control signal. Having reached a higher start-up rotational speed, this can be increased to at least synchronization speed or slightly above by back-deflection of the adjustment device.

In both cases described above, the hydraulic motor already exhibits a rotational speed. For renewed or further acceleration, the control signal for repeated direction of the deflection can be the same as the previous control signal, but it is also possible to create a different signal of different strength or duration in order not to influence the overall volume flow in the hydrostatic drive more than is unavoidable. The inventive concept also encompasses execution of this direction until at least the specified start-up rotational speed or synchronization speed is reached.

The case may also occur in which the engaging hydraulic motor reaches the synchronization speed after exceeding the start-up rotational speed but the shift or engagement operation cannot be successfully concluded due to a mechanical limitation of the clutch. In this state, the engaging hydraulic motor rotates at synchronization speed since the two clutch discs touch each other and there is a frictional connection between the clutch discs. However, this is not sufficient to achieve a power transmission as is possible by means of mechanical locking. This case occurs, for example, when the engaging hydraulic motor does not generate sufficiently high torque and is a burden on the hydromechanical drive train, so that the mechanical requirements for form-locking closure of the clutch are not met. It can also apply in cases where components such as cogs, jaws or similar protrusions and their corresponding recesses designed for engagement are brought into contact in such a way that interlocking or engagement is not possible because the shift or clutch force required for form-locking closure of the two clutch shafts does not exceed a certain level.

In order to alter the balance of torque at the clutch or alter the relative position of the components provided for power transmission, the engaging hydraulic motor can be directed to deflect to another defined deflection angle which is smaller than the maximum deflection angle, for example, by means of another command signal. The torque now generated by the hydraulic motor alters the torque balance at the clutch or the relative position of the force-transmitting components such that the shift operation can be successfully completed without the hydraulic motor leaving synchronization speed.

In order to compensate for the volume flow of hydraulic fluid absorbed by the engaging hydraulic motor, the control device can briefly increase the deflection of the hydraulic pump during the acceleration of the engaging motor. This compensation measure is to be withdrawn again during the subsequent back-deflection of the adjustment device of the accelerating hydraulic motor in order to prevent over-compensation.

Once the load-free hydraulic motor accelerated according to the invention reaches a synchronization speed at which the output shaft of the hydraulic motor or the clutch input shaft connected to the hydraulic motor exhibits the same or a slightly higher rotational speed than the clutch output shaft, the clutch can be closed in a virtually jerk-free manner. The method according to the invention to accelerate a hydraulic motor is able to engage and disengage a hydraulic motor free of impact and jerks regardless of whether the clutch used to connect or disconnect the hydraulic motor to or from a drive train is a friction clutch or a jaw clutch. This is particularly achieved in that clutch parts to be brought into a force lock, friction lock or form lock can be raised to nearly the same rotational speed by accelerating the load-free hydraulic motor using the method according to the invention.

After closure of the clutch, the volume flow of the pressurized hydraulic fluid must be adapted to the new situation since the additionally connected hydraulic motor must now be set to a displacement greater than zero—depending on the torque requirement of the hydromechanical drive train—in order for it to perform mechanical work. This should be effected quickly and in principle can be carried out in two ways, firstly by increasing the delivery volume of the hydraulic pump and secondly by reducing the displacement of the hydraulic motor remaining in the hydrostatic drive. An intermediate variant is conceivable—increasing the delivery volume of the hydraulic pump and simultaneous reduction of the displacement of the hydraulic motor remaining in the drive train—though this involves greater control complexity. Generally speaking, however, the delivery volume of the hydraulic pump will be adapted since this will possibly have already been slightly increased during peak current application to the hydraulic motor that is to be accelerated load-free and then engaged. The term peak current application used in this context is derived from the fact that an increasing and then decreasing signal is applied to the engaging hydraulic motor within a (short) period of time, whereby a small volume of pressure fluid flows through the hydraulic motor to be connected so as to accelerate the latter in a load-free state up to the rotational speed required for engagement free of impact and jerking. This brief increase and the renewed reduction of the control signal, as compared to the state just before initiation of the connection operation, is referred to in the context of this invention as peak current application to the adjustment device of the engaging hydraulic motor.

Due to tolerances in the manufacture of hydraulic motors and gears, it can occur that an initiated engagement process cannot be completed because of mechanical limitation—especially when using synchronized and non-synchronized jaw clutches. In this case, the invention proposes an additional peak current application to the adjustment device of the hydraulic motor which does not significantly accelerate the hydraulic engine but which merely alters its torque balance. This altered torque balance at the clutch serves to complete the engagement process.

In particular, the method according to the invention for engagement and disengagement is preferably usable in conjunction with hydraulic motors that have different output levels or different maximum levels of displacement and stroke volume, i.e. where there are differences in the maximum levels of torque that can be achieved in a hydrostatic drive. Here for example, a large-volume hydraulic motor, i.e. with a large cubic capacity, will be used to drive work units and/or for starting or hill climbing and small-volume hydraulic motors, i.e. with a smaller cubic capacity, will be used for fast travel—those hydraulic motors being disengaged that have a larger maximum stroke volume, for example.

The characteristics of hydraulic motors are such that hydraulic motors with a large cubic capacity in particular have a relatively narrow rotational speed range with relatively low maximum rotational speeds and, conversely, hydraulic motors with a small cubic capacity have a broader rotational speed range and thus achieve higher rotational speeds, which are preferred for (fast) travel, e.g. over a flat surface. For example, in the case of industrial vehicles to be moved from one place of deployment to another, the hydraulic motor with a large cubic capacity will be disengaged from the hydrostatic drive when a previously defined rotational speed is reached or exceeded. According to the invention, when a limiting rotational speed of the hydraulic motor with large cubic capacity is reached, the displacement is suddenly set to zero, while at the same time the supply pump is reduced by the corresponding delivery volume equal to the displacement of the disengaging hydraulic motor. After the clutch has been opened, the hydraulic motor is preferably braked by a mechanical brake or runs to standstill in a load-free state.

The rotational speed at which a hydraulic motor is disengaged or disconnected from the hydromechanical drive, i.e. at which its pressure fluid supply is interrupted, depends on many parameters but in particular on the construction type, output and conditions of deployment of the work machine in which the hydraulic motor is used. However, the rotational speed for a (renewed) engagement is not necessarily bound to the rotational speed for the (previous) disengagement. In practice, the limiting rotational speed for an engagement will be selected at a lower level than the rotational speed for disengagement, since normally the efficiency of a hydraulic motor increases as the rotational speed decreases, thereby maintaining the system efficiency of the hydromechanical drive at a high level. The hydraulic motor provided for fast travel exhibits a more even decrease in efficiency at decreasing rotational speed, for this reason the rotational speed for engagement can be selected at a lower level than the rotational speed for disengagement in order to avoid frequent shift or engagement operations. When transferring to fast travel, the effect of the decrease in efficiency is less severe due to the increase in rotational speed, since the fast rotating hydraulic motor is provided for disengagement and does not subsequently contribute to driving the work machine, i.e. the sudden negative change in output or torque will be selected at a level which is as low as possible after deactivation of a hydraulic motor. Conversely, the hydraulic motor should provide immediate performance capacity for (renewed) engagement, for which purpose the highest possible degree of efficiency is preferable. With the disengagement and engagement method according to the invention it is possible—contrary to the state of the art—to select the limiting rotational speed for engagement independently and therefore at a lower level than for disengagement. In this way, the rotational speed for disengagement can be selected at a higher level as compared to the state of the art, since it is not necessary to allow for the interventional impact that applies in the state of the art and but which does not exist in the method according to the invention. What is more, according to the invention the engagement operation is not carried out in the reverse order of the disengagement operation and can therefore be independently controlled and effected at a lower rotational speed, at which the engaging hydraulic motor demonstrates a higher degree of efficiency.

The state of the art proposes that the limiting rotational speed for disengaging and engaging a hydraulic motor should be at the same level. Even though such a method is covered by the inventive concept, it is preferable according to the invention for a hydraulic motor not required until a higher speed of travel is reached to be disengaged at a higher rotational speed of the output shaft of the mechanical drive than is necessary for re-engagement. This is also preferably effected in this way so that the engaging hydraulic engine has to be accelerated in a load-free state to rotational speeds that are not too high and beyond because the (large-volume) engaging hydraulic motor is able to supply a higher level of torque with better efficiency at a lower rotational speed, whereby the engagement operation can be effected in a more gentle, energy-saving manner and with more effective force locking.

Another reason for engaging a hydraulic motor in a hydrostatic drive at a rotational speed which is lower than that at which the motor was previously disengaged lies in the fact that hydraulic motors below a critical deflection angle demonstrate reduced efficiency, so it is advisable in terms of energy to avoid the range of hydraulic motors with a reduced level of efficiency. For example, the state of the art specifies for a hydraulic motor of swash plate type an angle of 4 degrees as the lower limiting angle for deflection of the swash plate at which the motor can still be operated at a reasonable degree of efficiency. However, this will vary depending on the type of the hydraulic motor and is not necessarily directly applicable to hydraulic motors of the swivel axis type. Nor can this specification be applied to radial piston motors with adjustable eccentricity. However, it is generally true to state that hydraulic motors demonstrate a lower degree of efficiency as displacement decreases. With the method according to the invention, the limiting angle positions for disengaging and (re-)engaging a hydraulic motor can be adapted to a work machine in optimum fashion, flexibly and independently of one another and according to the mode of operation which best matches the given situation. When operating the work machine, it is also possible to alter the two limiting angles for disengagement and engagement independently based on operational requirements. The method according to the invention can include a rotational speed hysteresis generated between disengagement and engagement that contributes to the engageable and disengageable hydraulic motor being able to be operated in more favorable efficiency ranges. What is more, it is possible to achieve a lower shift frequency. This not only reduces the amount of energy used for the hydromechanical drive, it also reduces shift frequency, thereby contributing to a longer service life and higher reliability of the hydromechanical drive.

Another reason why the rotational speed for engagement should preferably be lower than the rotational speed for disengagement is that a hydraulic motor at a lower rotational speed and with the same volume flow of pressure fluid available—i.e. when the hydraulic pump is constantly fully deflected—is able to supply a higher level of torque because its displacement can be set at a higher level accordingly. If the engagement operation is initiated at the same rotational speed as the disengagement operation, as proposed by the state of the art for a deflection angle of 4°, for example, the engaging hydraulic motor can only supply a low level of torque at an increased rotational speed, and also it would not offer optimum efficiency. The rotational speed at which the previously disengaged hydraulic motor is to be re-engaged will therefore generally be selected as higher than the disengagement rotational speed, since the connectable hydraulic motor can then supply an appreciable torque and also be operated in a better efficiency range. Of course, the reverse selection of engagement conditions is likewise covered by the invention and can be realized by the method according to the invention without structural changes having to be made to the hydromechanical drivetrain.

In practice—as already set out above—it will be preferable to effect compensation of additional pressure fluid needs of the engaged hydraulic motor by increasing the delivery volume of the hydraulic pump, which requires the hydraulic pump to be reduced in its deflection before the start of peak current application to the adjustment device of the engaging hydraulic motor, to the extent that both hydraulic motors can be supplied with pressure fluid by the hydraulic pump after engagement of the additional hydraulic motor. So if after engagement, the engaged hydraulic motor is required to supply a level of torque which is higher than that of the hydraulic motor at the time of disengagement, for example, its deflection angle must be larger than at the time of disengagement. As a result, the hydraulic pump requires a greater adjustment reserve in order to supply the pressure fluid volume required by the hydraulic motor after engagement in addition to the pressure fluid volume of the hydraulic motor remaining in the drive. If the rotational speed for an engagement operation is selected at such a low level that the work machine is in an operating state in which the hydraulic motor remaining in the drive is full and the hydraulic pump supplying pressure fluid is only partially deflected, this displacement of pressure fluid required by the engaging hydraulic motor can be provided by increasing the deflection of the hydraulic pump, for example. This increase will preferably occur swiftly or suddenly after engagement of the other hydraulic engine. According to the invention, a sudden adjustment of a hydraulic machine is understood to mean that a delivery volume or displacement of a hydraulic machine is adjusted along a steep ramp which takes the dynamic properties of the hydraulic machine into account. In an adjustment angle/time diagram, a control signal created for a sudden adjustment will exhibit an almost vertical slope, with the relevant adjustment angle of the adjustment device showing a flatter rise/fall, following the control signal due to forces of inertia until the value specified by the control signal or a predefined deflection is reached as required.

As set out above, the disengagement and engagement method will be used in hydrostatic drives comprising hydraulic motors with differing stroke volumes, though the inventive concept naturally also covers an identical embodiment comprising one or more hydraulic motors, as well as the embodiment of a hydraulic motor as fixed displacement motor or the use of a second hydraulic pump in a closed hydraulic fluid circuit. Regardless of the number or type of hydraulic machines, for example whether these are axial piston or radial piston machines with a large or small maximum stroke volume, any individual hydraulic motor can be disengaged from or engaged with the hydraulic drive using the engagement and disengagement operation according to the invention to adjust output and therefore achieve a larger transmission range, provided the disconnectable and (re-)connectable hydraulic motor is variable in its displacement.

In applying the method according to the invention, it will also be preferable to monitor the rotational speed of the output shaft of the shared mechanical drive so that it is possible to determine the rotational speeds predefined for engagement and disengagement. Instead of determining the individual rotational speed, however, it is also possible to use the adjustment angle of the individual hydraulic machine, in particular that of the hydraulic motors in relation to the hydraulic pump, whereby the flow of hydraulic fluid can also be indirectly defined. Another parameter for the engagement or disengagement of one or more hydraulic motors from a hydrostatic drive train can also be, for example, the vehicle speed of the work machine, which can be derived from the rotational speed of the output shaft of the mechanical drive with which the hydraulic motors are connected. Another preferred parameter for enabling an engagement operation is the operating pressure in the closed circuit for hydraulic fluid.

In order to engage a hydraulic motor, the hydraulic motor to be engaged will preferably be accelerated to a point at which its rotational speed is slightly higher than the synchronization speed required at the clutch for engagement purposes. The result of this is that the hydraulic motor to be engaged does not have to be further indirectly accelerated by the hydraulic motor remaining in the drive train when the clutch is closed so as to reach the synchronization speed required. This would place a strain on the other hydraulic motor, which after all is still in operation, and would potentially be felt in the response of the work machine, since the other hydraulic motor would have to compensate for the acceleration of the engaged hydraulic motor. A reduction in rotational speed throughout the entire hydrostatic drive train would be felt in the drive response, for example. However, decelerating the engaging hydraulic motor when it demonstrates a rotational speed at the clutch input shaft that is higher than the synchronization speed at the clutch output shaft can easily be effected by means of mechanical braking. According to the object of the invention, it should ideally be avoided that connection or disconnection of a hydraulic motor to or from the hydrostatic drive is noticed by a person operating the work machine.

As suggested above, the method according to the invention is applicable to all hydrostatic drive trains in a hydromechanical transmission in which there is at least one hydraulic pump and two hydraulic motors arranged in parallel, whereby one of the two hydraulic motors is adjustable and can be disengaged and engaged from a shared gear (intermediate gear) for the two hydraulic motors by means of a clutch. Such connection or disconnection of another hydraulic motor to and from the hydrostatic section of a hydromechanical transmission is not limited to any number of hydraulic motors or hydraulic pumps used, as long as at least one adjustable hydraulic motor is supplied with pressure fluid by a hydraulic pump arranged in the closed circuit. "Peak current application" to the adjustment device of the hydraulic motor to be engaged means that the hydraulic motor is preferably accelerated load-free to a rotational speed that is greater than a synchronization speed of the assigned clutch, ensuring gentle connection of another hydrostatic power unit while maintaining the flow of power. In particular in the use of hydraulic motors with differing maximum stroke volumes, this enables wide-ranging transmission ratios to be achieved for the levels of torque and rotational speed of a hydromechanical transmission, as well as allowing overall efficiency to be maintained at a high level. The construction type of the hydraulic machine used, whether axial or radial piston, is immaterial.

BRIEF DESCRIPTION OF THE DRAWINGS

The following figures provide a schematic and exemplary explanation of the inventive concept in a non-limiting fashion, as follows.

DETAILED DESCRIPTION OF THE PREFERRED EMBODIMENTS

Figure 1:
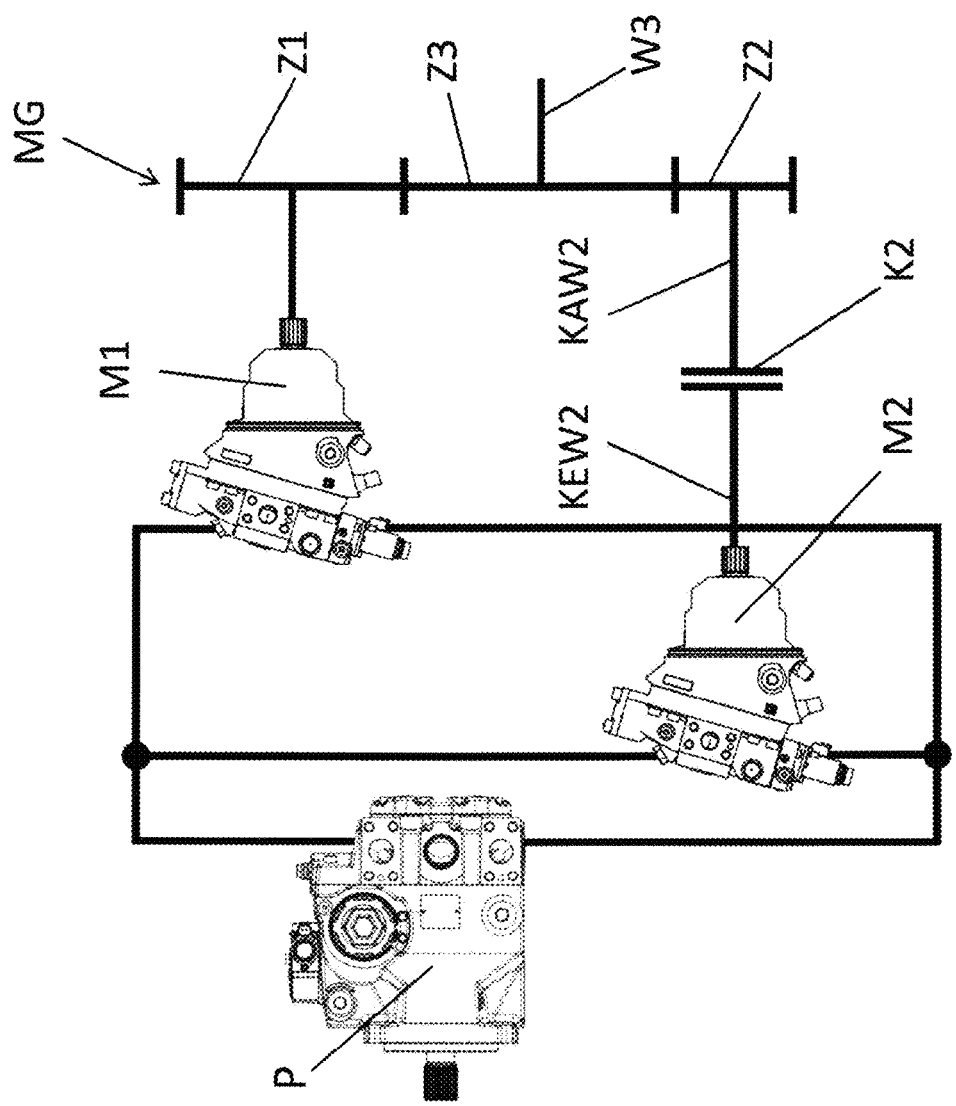
FIG. 1 The fundamental structure of a hydromechanical drive to which the method according to the invention can be applied.

FIG. 1 shows a hydromechanical transmission with a hydrostatic drive and a downstream mechanical drive MG. A hydraulic pump P, a hydraulic motor M1 and a hydraulic motor M2 are arranged in series. The two hydraulic motors M1 and M2 are connected via the mechanical drive MG when a clutch K2—with a clutch input shaft KEW 2 and a clutch output shaft KAW 2—positioned between the hydraulic motor M2 and the mechanical drive MG is closed. The example of a hydromechanical transmission shown in FIG. 1 exhibits different transmission ratios in the mechanical drive for the two hydrostatic drives, since the first hydraulic motor should preferably be used for the high travel speed and the second hydraulic motor for the high tractive force. Therefore the mechanical transmission is preferably harmonized with the hydrostatic transmission so that a level of power can be achieved across the entire rotational speed range without an interruption in tractive force and maintaining optimum efficiency.

The mechanical drive MG has a mechanical output shaft W3 for both the hydraulic motors by means of which the hydromechanically converted power of the combustion engine (not shown) can be supplied to a work machine not depicted here. The output shaft W3 can represent the drive shaft for a travel drive, for example. In the hydromechanical drive train shown in exemplary fashion in FIG. 1, the motor M1 is permanently connected to the mechanical drive and is therefore preferably the hydraulic motor with the smaller displacement, which can be used to provide a fast gear, for example. In the example shown in FIG. 1 of a hydromechanical drive, the hydraulic motor M1 is operatively connected to the output shaft W3 by means of a cogwheel Z1 which interlocks with a cogwheel Z3. Here the output shaft W3 can be directly connected to a mechanical drive train, such as a transmission or directly to a wheel, a winch, a sprocket or similar.

When the clutch K2 is closed, the second hydraulic motor M2 is also operatively connected to the output shaft W3 via a cogwheel Z2 which likewise interlocks with the cogwheel Z3. When the clutch K2 is closed, therefore, both hydraulic motors act on the shared output shaft W3. In this way the power delivered by the hydraulic pump P in the form of pressurized pressure fluid is transmitted via the two hydrostatic motors M1 and M2 and via the mechanical drive MG onto the output shaft W3 of the hydromechanical transmission.

Figure 2:
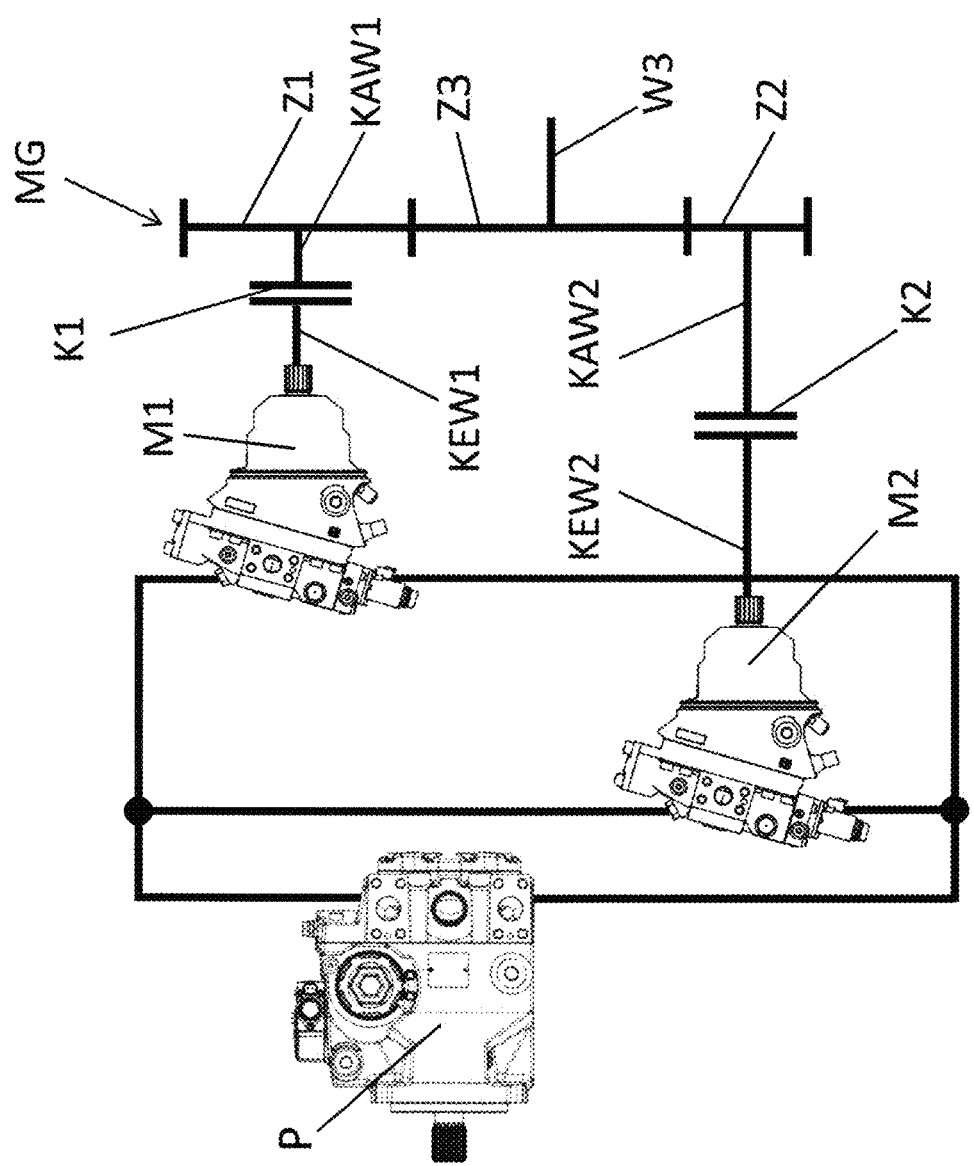
FIG. 2 Another preferred embodiment of a hydromechanical drive to which the method according to the invention can be applied.

FIG. 2 shows a modification of the preferred embodiment of FIG. 1 in which a clutch K 1 is additionally positioned between the hydraulic motor M1 and the mechanical drive MG, enabling alternating disengagement and engagement of the two hydraulic motors M1 and M2. This type of hydromechanical arrangement makes for greater flexibility of the hydromechanical transmission as compared to the preferred embodiment shown in FIG. 1. The method according to the invention is equally applicable to hydraulic motor 1 as it is to hydraulic motor M2, as described in reference to FIG. 1. In the same way, other hydraulic motors with assigned clutches and cogwheels can be incorporated in parallel in the hydrostatic section of the hydromechanical transmission and are then also covered by the inventive concept. The same applies to an expansion of the hydrostatic section to include one or more hydraulic pumps so as to increase hydrostatic power. Since the increase in hydrostatic power does not increase in proportion to the stroke volume of a hydrostatic machine, in some applications it is preferable to use two or more hydraulic machines of small cubic capacity rather than one large hydraulic machine. This applies both to hydraulic pumps and to hydraulic motors. The use of smaller hydraulic machines makes the hydrostatic drive more flexible and agile in terms of its response in the case of load changes. In conjunction with the method according to the invention, individual hydraulic machines can be flexibly incorporated in the hydrostatic drive of a hydromechanical transmission without having to allow for losses in terms of handling or operating comfort of the work machine.

Figure 3:
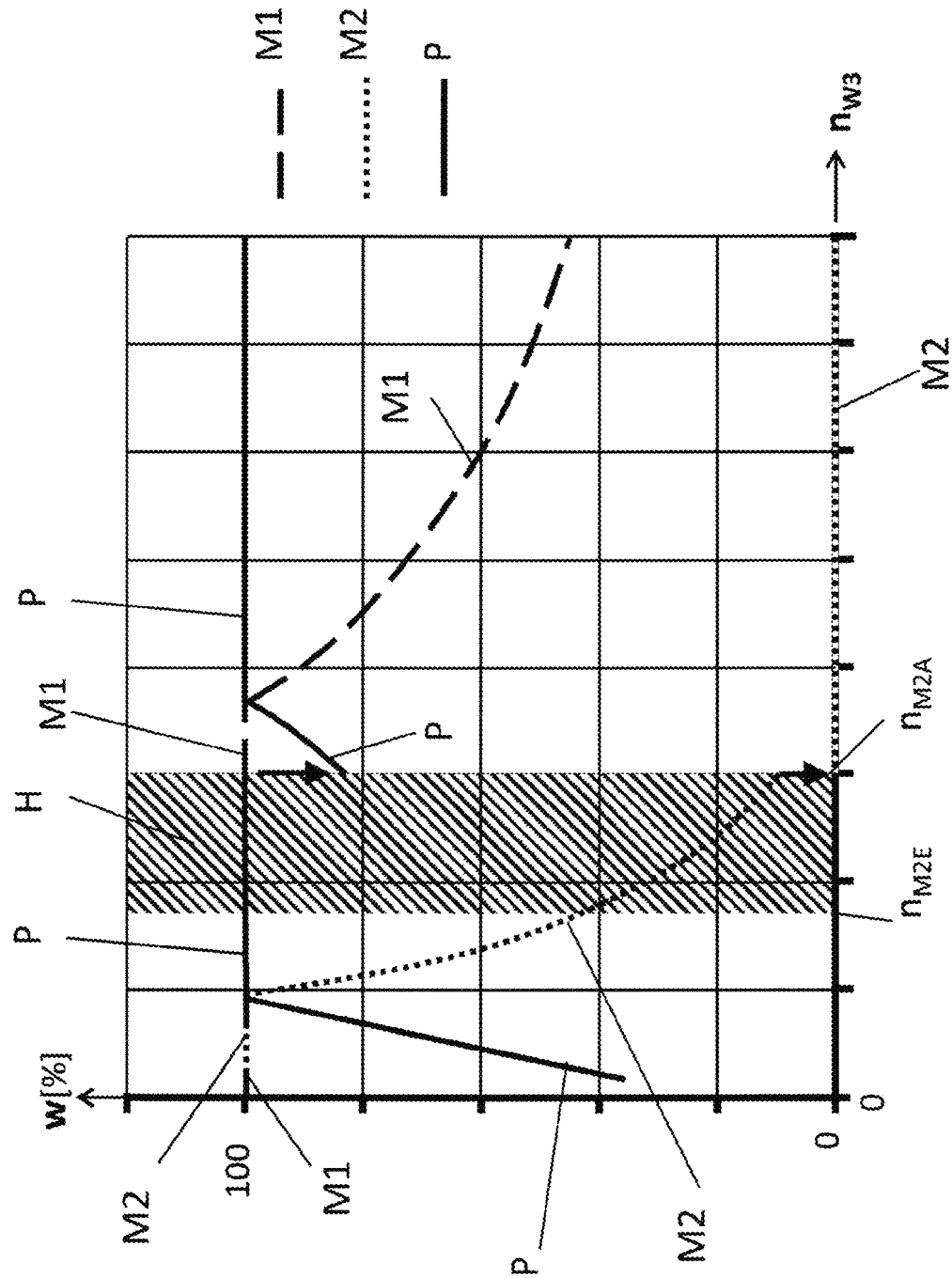
FIG. 3 A graph showing the adjustment angle curve in relation to the rotational speed of the drive shaft for disengagement of a hydraulic motor from the exemplary hydromechanical drive shown in FIG. 1.

FIG. 3 consists of an exemplary graph for a hydrostatic drive in a hydromechanical transmission with hydraulic machines in swivel axis or swivel disc construction showing how the curve of the delivery volume of the hydraulic pump P in preferred embodiment 1 or 2 and the curves of the displacements of the two hydraulic motors M1 and M2 in the two preferred embodiments 1 or 2 are controlled in relation to rotational speed in an engagement operation according to the invention. Here the vertical axis shows the deflection or swiveling expressed as a percentage and the horizontal axis shows the rotational speed of the output shaft W3, rising from left to right.

If one assumes the work machine to be accelerated from standstill, for example, when the hydraulic motors M1 and M2 are fully deflected, the delivery volume of the hydraulic pump P is increased from the zero position—deflection angle equals zero—until the hydraulic pump is fully deflected. In this phase, the work machine has reached the maximum level of torque which can be supplied by the hydraulic pump. In this state, the maximum power that can be provided by a driving motor, in particular a diesel motor, is supplied at maximum torque by the two hydraulic motors M1 and M2 to the mechanical drive.

If travel speed is to be further increased, the displacement of at least one of the two motors has to be reduced so that it rotates faster. In the preferred embodiment of FIG. 3, this initially occurs in motor M2. By reducing the deflection angle of motor M2 while simultaneously maintaining the full deflection angle of the hydraulic pump P, the work machine is accelerated. When a limiting angle is reached for the adjustment unit of hydraulic motor M2 and to prevent the hydraulic motor M2 from moving into an excessively high speed range, the adjustment unit of the hydraulic motor M2 is suddenly set to zero, thereby reducing the displacement of the hydraulic motor M2 to zero.

At the same as the sudden back-deflection of the adjustment device of the hydraulic motor M2 that allows for dynamic properties, the hydraulic pump P is also reduced in its delivery volume by the relevant amount of the suddenly reduced displacement of the hydraulic motor M2—as quickly as inertia forces allow so that the displacement of the hydraulic motor M1 does not have to be adjusted. The hydraulic liquid flow in the closed circuit is adapted to the new situation and the output of the pressure medium remains constant—increased pressure at reduced fluid flow. At the same time, this means that the hydraulic motor M1 is not accelerated.

After disengagement, the delivery volume of the hydraulic pump P is increased by further deflection of the adjustment device in order to increase vehicle travel speed until the hydraulic pump P has again reached full deflection, i.e. its maximum delivery volume. In order to further increase the travel speed of the work machine, the displacement of the first hydraulic motor M1 now has to be reduced so that the delivery volume of the hydraulic pump P effects a higher rotational speed of the first hydraulic motor M1. At a certain position of reduced deflection of the hydraulic motor M1, the vehicle or work machine reaches its maximum speed.

At a state of maximum speed, the travel drive then logically exhibits minimum torque. This type of operating state of a work machine is reached on a flat road surface, for example.

Figure 4:
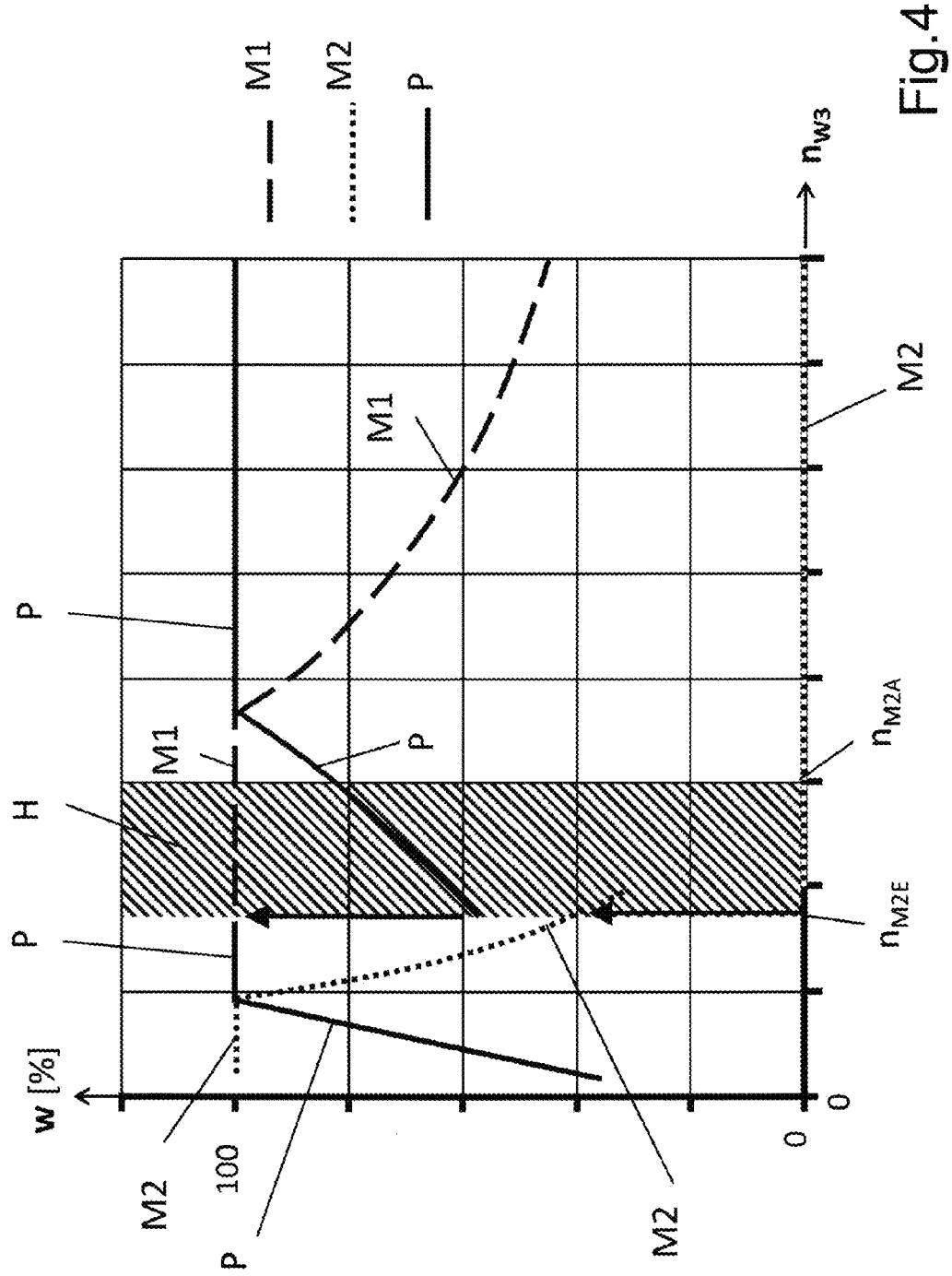
FIG. 4 A graph showing the adjustment angle curve in relation to the rotational speed of the drive shaft for the engagement of a second hydraulic motor in the hydromechanical drive shown in FIG. 1.

If the travel speed is reduced due to the fact that the work machine climbs a gradient, for example, the work machine requires a higher level of torque so the deflection angle of the first hydraulic motor M1 is reduced. FIG. 4 shows an exemplary graph for the engagement operation according to the invention based on an operating state of a work machine travelling at a fast speed, for example on a steep climb. The vertical axis once again shows the deflection of the hydraulic machines involved expressed as a percentage, while the horizontal axis shows the speed or rotational speed of the hydraulic machines decreasing from right to left. The graph shown in FIG. 4 should therefore preferably be read from right to left.

If more torque is required of the work machine, the displacement of the first hydraulic motor M1 is initially increased, enabling it to supply a higher level of torque. At a constant delivery rate of the pump P—still fully deflected—the rotational speed of the first hydraulic motor M1 is reduced, thereby reducing the travel speed of the work machine. As the torque requirement continues to increase, the deflection of hydraulic pump P is reduced when a point of balance is reached between flow rate and displacement, at full deflection of hydraulic motor M1 and hydraulic pump P, whereby the working pressure or operating pressure and therefore the torque at hydraulic motor M1 is necessarily increased, simultaneously reducing the rotational speed of the first hydraulic motor M1 and therefore also the travel speed.

Below a certain rotational speed, which can be adapted according to the specific application, the second hydraulic motor M2 can initially be accelerated load-free. As soon as the second motor M2 has reached a synchronization speed that is the same or slightly higher than an engagement speed at the input shaft KEW2 of the clutch K2 for example, the clutch K2 is closed.

The section shaded in grey in FIGS. 3 and 4 shows a rotational speed range, for example, at which both motors M1 and M2 deliver power prior to disengagement but where the second motor M2 is not yet actively involved in the power output of the hydrostatic section of the hydromechanical transmission prior to an engagement operation from a higher speed. This hysteresis range is particularly preferred when the second hydraulic motor M2 is operated at a low vehicle speed with a higher torque requirement than the first hydraulic motor, which is provided for fast travel, for example. With this type of hysteresis speed range, the levels of efficiency of the hydraulic motors used can be deployed in optimum fashion since at a medium speed the efficiency reduction does not impact on power output as strongly as when a high level of torque is required for slow travel. As mentioned at the beginning, the efficiency of a hydraulic motor in particular—and this applies in the same way to a hydraulic pump—is reduced disproportionately as the deflection of the relevant hydraulic machine is reduced (cf. FIG. 7).

Figure 5:
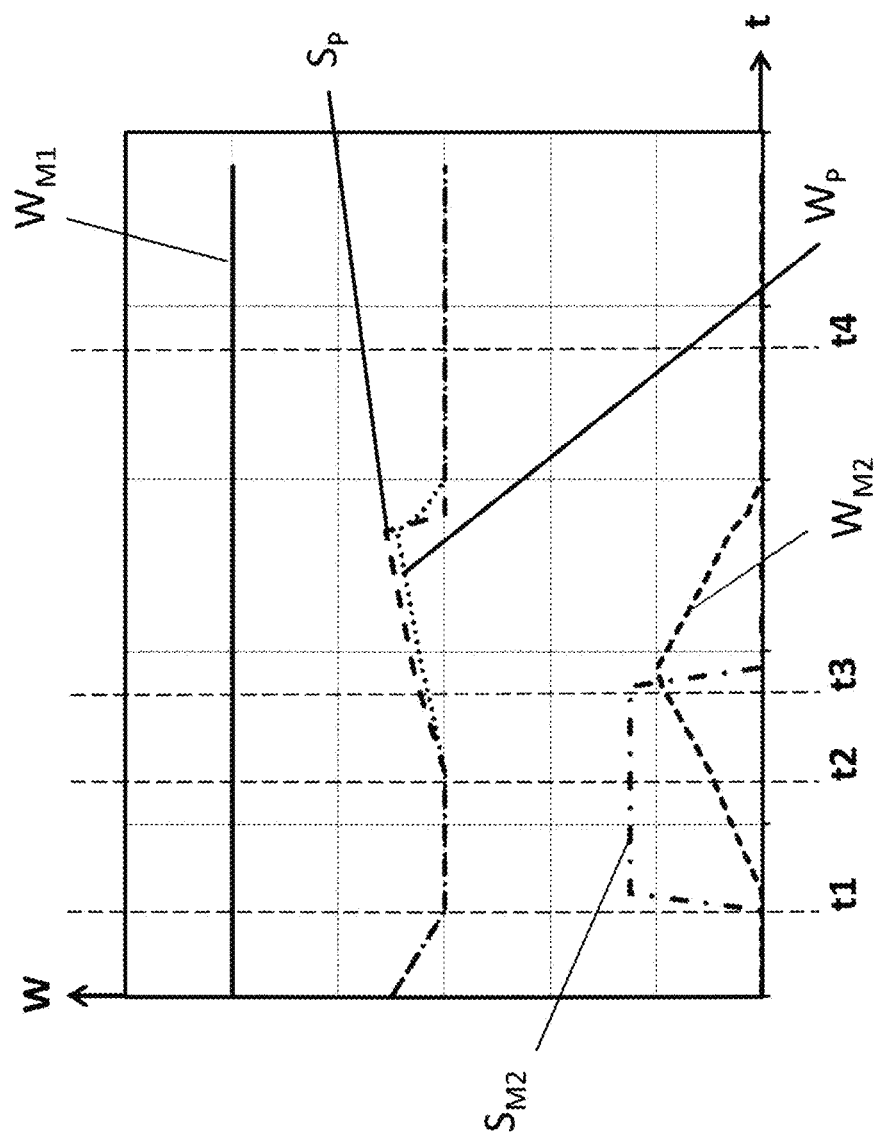
FIG. 5 A graph showing the curve of deflection adjustment angles of the hydraulic machines over time during engagement according to the invention of a second hydraulic motor into the hydromechanical drive shown in FIG. 1.
Figure 6:
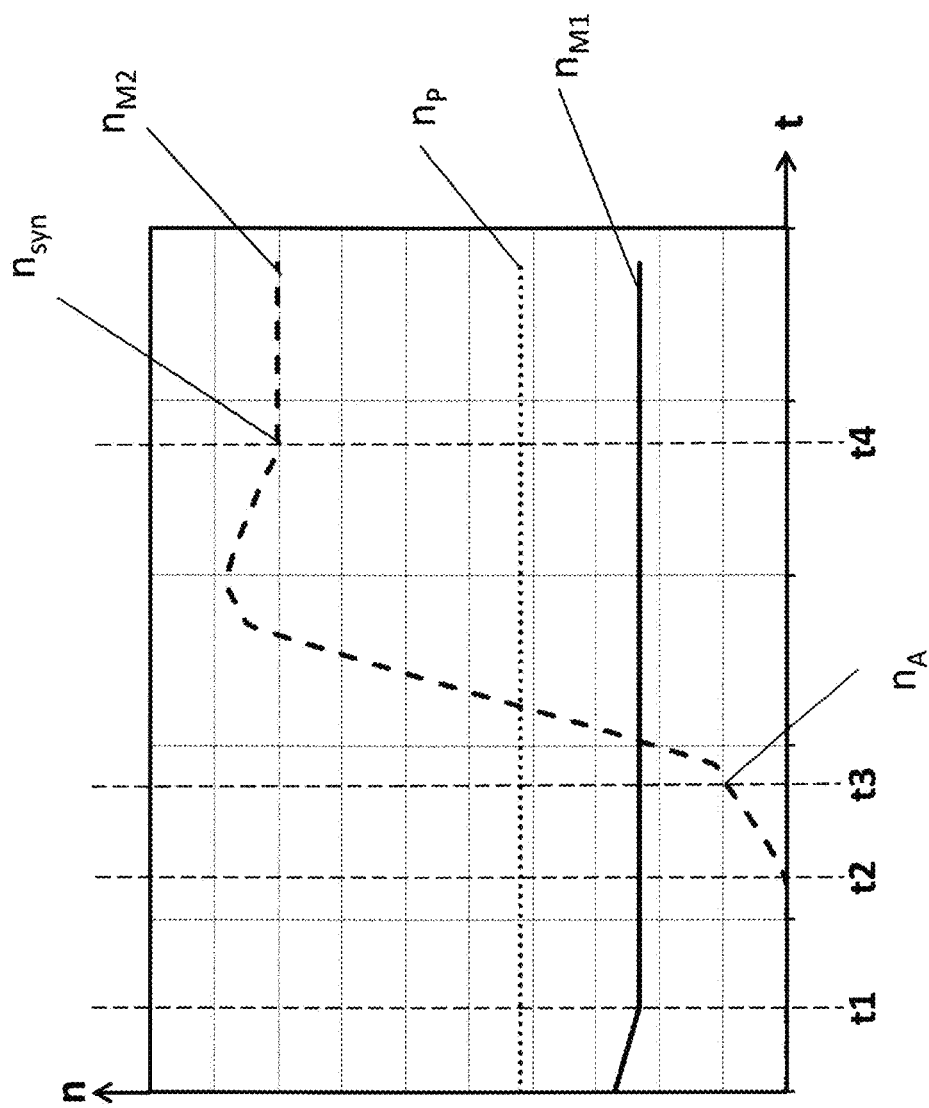
FIG. 6 A graph showing the curve over time of the rotational speeds of the hydraulic machines when a second hydraulic motor is engaged in the hydromechanical drive shown in FIG. 1.

The method according to the invention for the acceleration of the second hydraulic motor M2 up to synchronization speed or just above will now be explained in exemplary fashion based on the graphs shown in FIGS. 5 and 6. FIGS. 5 and 6 consist of graphs whose ordinates show the elapse of time. The vertically marked dashed lines in these graphs each show a point in time at which a change occurs in the hydromechanical drive system. In the first dashed line from left, the point in time t1 is reached at which, for example, a control device ascertains that the rotational speed at the output shaft W3 of the hydromechanical drive train is lower than the previously defined rotational speed for the engagement of the hydraulic motor M2. At the same time there is a torque requirement which can no longer be met solely by the hydraulic motor M1. At this point in time t1, the control device will verify whether the operating pressure in the hydrostatic section of the hydromechanical drive is sufficiently high for the hydraulic motor M2 to be effectively accelerated without impacting on the operating response of the first hydraulic motor M1 or the hydraulic pump P. If all three conditions are fulfilled, the control device directs the adjustment unit of the hydraulic motor M2 to a deflection angle greater than zero, though significantly smaller than the maximum deflection angle. This is shown in FIG. 5 by means of the dash-dotted line $S_{M2}$. The dash-dotted line shows the "peak current application" to the adjustment device of the hydraulic motor M2. The control signal $S_{M2}$ has a steeply climbing slope to direct the deflection angle of the adjustment device of the hydraulic motor M2 to a defined value which is well below an angle of full deflection of the hydraulic motor M2. Here, the increase of the deflection angle $W_{M2}$ of the hydraulic motor M2 is significantly flatter than the rising slope of the control signal $S_{M2}$, which is due to the inertia of a hydraulic machine inherent in the system. Within the context of the invention, a sudden change in the delivery volume or displacement is to be understood as the response of the hydraulic machine to a control signal which essentially follows a vertically rising or falling slope.

In a preferred embodiment, this defined deflection angle $W_{M2}$ is preferably less than 20% of the maximum deflection angle in order to set the hydraulic motor M2 in motion. The curve of the deflection angle $W_{M2}$ of the hydraulic motor M2, shown by means of a dashed line in FIG. 5, becomes flatter than the defined control signal $S_{M2}$ as time elapses since the control device hydraulically tracks the electrical control signal $S_{M2}$. Between the rising and falling slope, the control signal $S_{M2}$ remains approximately at a constant level so that the adjustment device further enlarges the deflection angle $W_{M2}$ of the hydraulic motor M2.

FIG. 6 consists of a graph showing the rotational speed curve of the hydraulic machines P, M1 and M2 of the hydrostatic drive over the same period of time, whereby the vertical dashed lines show the same points in time t1-t4 during the sequence of the engagement operation for hydraulic motor M2 as in FIG. 5. The hydraulic motor M2 begins to turn at the second vertical line from the left at point in time t2, meaning that it requires or is able to take up displacement flow. This displacement volume can be provided, for example, by increasing the delivery volume of the hydraulic pump P, which is also shown in FIG. 5 by means of the dashed line $S_P$. As already explained above, the displacement required by the hydraulic motor M2 can also be compensated by reducing the displacement of hydraulic motor M1, though in this case a change in the operating response of the work machine may be felt. At the dashed line third from left, i.e. at point in time t3, the control signal $S_{M2}$ is withdrawn since the hydraulic motor M2 has reached a predefined start-up rotational speed which is set so as to be sufficient to ensure the further acceleration of the hydraulic motor M2. By withdrawing the control signal S, the deflection angle $S_{M2}$ of the hydraulic machine M2 is reduced once again, whereby the falling displacement of the hydraulic motor M2 continues to generate an accelerating torque due to the ongoing constant operating pressure, so that the rotational speed $_{M2}$ of the hydraulic motor M2 continues to increase. When a rotational speed $n > n_{syn}$ is reached, the load-free accelerated hydraulic motor M2 can be engaged in the hydrostatic drive of the hydromechanical transmission MG by closing the clutch K2 at a point in time t4. By accelerating the hydraulic motor M2 up to this rotational speed, the engagement operation of the hydraulic motor M2 in the hydromechanical drive can be carried out virtually free of impact and jerking.

FIG. 6 consists of graph showing that the hydraulic motor M1 remains at a constant rotational speed during the entire acceleration and engagement operation for the hydraulic motor M2, whereby its displacement or its deflection angle $W_{M1}$ should preferably also remain constant (cf FIG. 5). In this way, the independent control and regulation method according to the invention can be used to engage the hydraulic motor M2 from load-free standstill in the hydromechanical drive without impacting on the operating response of the work machine in the form of impact or jerking.

Figure 7:
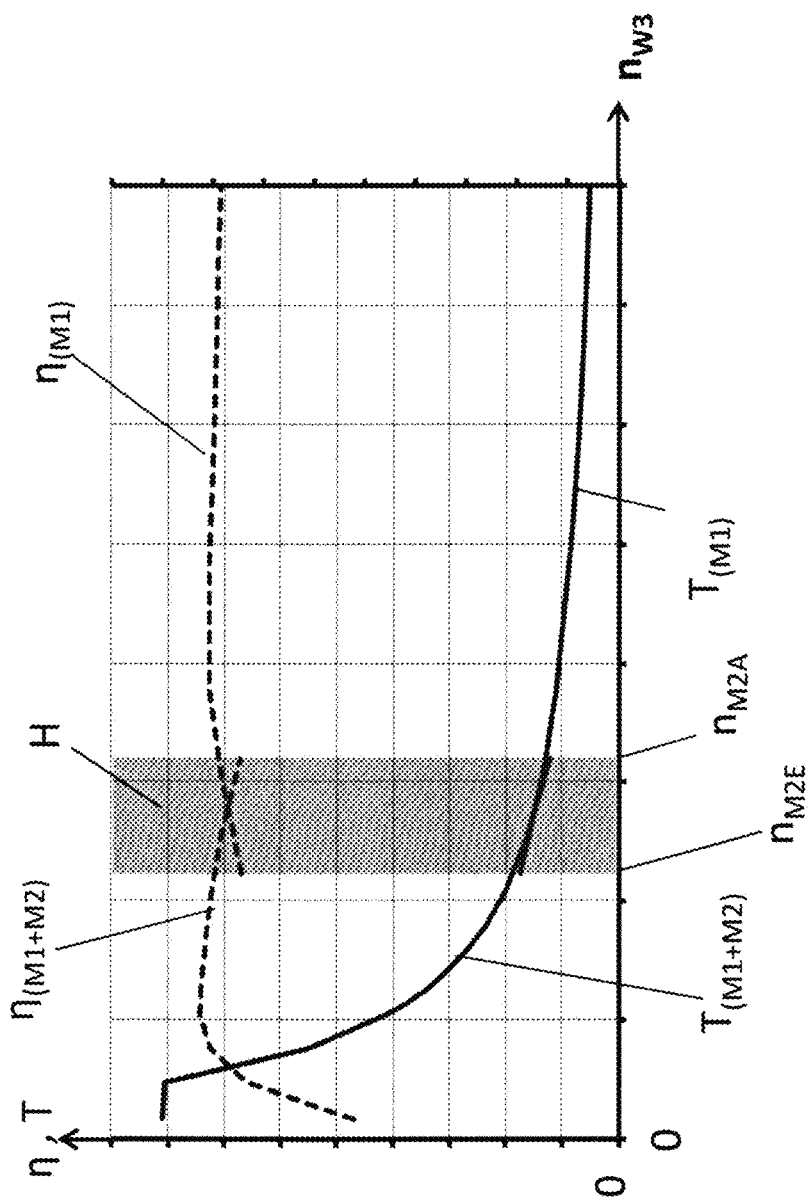
FIG. 7 An exemplary graph showing the torque and efficiency curve in relation to the output speed of the hydromechanical drive shown in FIG. 1.

FIG. 7 comprises a graph showing the torque curve for the entire hydromechanical drive in relation to the rotational speed of the output shaft of the hydromechanical drive MG. Here the torque curve is virtually constant, showing clearly that the operating response almost goes unnoticed by the machine operator when the method according to the invention is applied. The machine operator always has at his disposal the level of tractive force/torque that provides optimum efficiency in the selected mode of operation. The dashed lines in FIG. 7 show the efficiency curve for the entire system of the hydromechanical drive controlled by means of the method according to the invention. Here it is noticeable that within the hysteresis range H shaded in grey, the reduction in efficiency is only permitted up to a certain point and that the use of the engagement and disengagement method according to the invention enables efficiency to be maintained at a high level. Following the efficiency line from left to right, the first dashed line $n_{(M1+M2)}$ ends at the moment at which the second hydraulic motor M2 is disengaged, when it jumps onto the second dashed efficiency line which traces the efficiency curve of the hydraulic motor M1 at increasing rotational speed. Following the dashed line from right to left, its end represents the point in time or operating state of the hydromechanical drive at which the hydraulic motor M2—at standstill up to that point—is engaged in the hydromechanical drive MG. The efficiency level then jumps from the dashed line n (M1) onto the left-hand dashed line $n_{(M1+M2)}$, which shows an increase when viewed from right to left.

The method according to the invention was explained in exemplary fashion for a work machine but is applicable in principle to all hydromechanical drives which implement the structure shown in FIG. 1 or 2. The method according to the invention is not limited to travel drives and can also be applied to lifting, conveyance or construction devices such as diggers, etc. It can generally always be used when a fast gear with a relatively low level of torque is to be provided along with a slow gear with a high load and a relatively high level of torque.

What is claimed is:

1. Method for the disengagement and engagement of a hydraulic motor (M1, M2), adjustable in its displacement, from and to a hydrostatic drive train of a hydromechanical transmission with a closed hydraulic fluid circuit, comprising the steps of:
providing two adjustable hydraulic motors (M1, M2) and a hydraulic pump (P) that are arranged in parallel and the hydraulic motors (M1, M2) are connected on an output side to a mechanical drive (MG), and the at least one of the two hydraulic motors (M2) is connected via an assigned clutch (K2) to the mechanical drive (MG);
causing the at least one of the hydraulic motors (M2) to engage the hydromechanical transmission from a disengaged state by means of the clutch (K2) during operation of another of the least one hydraulic motors (M1) and the hydraulic pump (P), based upon a driving situation, and causing prior to a closing of the clutch (K2) the at least one hydraulic motor (M2) to be engaged is accelerated load-free by a deflection of its adjustment device where a rotational speed of an-assigned clutch input shaft (KEW2) of the clutch (K2) is at least equal to a rotational speed of a relevant clutch output shaft (KAW2) of the clutch (K2) which is connected to the mechanical drive (MG), so that both hydraulic motors (M1, M2) act on a shared output shaft (W3) of the mechanical drive (MG).

2. Method for the disengagement and engagement of an adjustable hydraulic motor (M1, M2) according to claim 1 by which the method for engagement of the at least one hydraulic motor (M2) at a decreasing rotational speed ($n_{W3}$) of the shared output shaft (W3) also comprises the following steps:
a) Monitoring of the rotational speed ($n_{W3}$) of the shared output shaft (W3) of the mechanical drive (MG) and of the operating pressure in the closed hydraulic fluid circuit;
b) Generation of a control signal ($S_{M2}$) to deflect the at least one hydraulic motor (M2) to be engaged, the clutch (K2) being open, from the zero position to a deflection angle ($W_A$) which is smaller than the maximum deflection angle, when the rotational speed ($n_{W3}$) of the shared output shaft (W3) falls below a predefined level ($n_{M2E}$) and the operating pressure is higher than a predefined level, so that the at least one hydraulic motor (M2) to be engaged is accelerated;
c) Withdrawal of the control signal ($S_{M2}$) to reduce the deflection angle of the at least one hydraulic motor (M2) to be engaged when the at least one hydraulic motor (M2) to be engaged has reached a predefined start-up rotational speed ($n_A$);
d) Closing of the clutch (K2) when the second of the at least one hydraulic motor (M2) has reached a rotational speed which is at least equal to a synchronization speed ($n_{syn}$).

3. Method for the disengagement and engagement of an adjustable hydraulic motor (M1, M2) according to claim 2 by which the at least one hydraulic motor (M2), if has not reached the start-up rotational speed or the synchronization speed ($n_{syn}$), is once again directed by a control signal ($s_{M2}$) to deflect once again from the zero position to a deflection angle (WA) which is smaller than the maximum deflection angle and steps c) and d) are repeated.

4. Method for the disengagement and engagement of an adjustable hydraulic motor (M1, M2) according to claim 2 by which, if the at least one hydraulic motor (M2) cannot be successfully engaged by means of force-locking after reaching a synchronization speed ($n_{syn}$), the at least one hydraulic motor (M2) is once again directed by a control signal ($S_{M2}$) to deflect once again to a deflection angle (WA) which is smaller than the maximum deflection angle, and the clutch (K2) for the force-locking connection of the at least one hydraulic motor (M2) to the mechanical drive is closed, whereby the control signal ($S_{M2}$) is withdrawn when force-locking is achieved.

5. Method for the disengagement and engagement of an adjustable hydraulic motor (M1, M2) according to claim 4 by which the predefined level of the rotational speed ($n_{w3}$) of the shared output shaft (W3) for engagement ($n_{M2E}$) of the at least one hydraulic motor (M2) is less than the predefined level of the rotational speed ($n_{w3}$) of the shared output shaft for disengagement ($n_{M2A}$) of the at least one hydraulic motor (M2).

6. Method for the disengagement and engagement of an adjustable hydraulic motor (M1, M2) according to claim 2 by which the delivery volume of the hydraulic pump (P) is briefly increased and/or the displacement of the first hydraulic motor (M1) is briefly reduced in order to compensate for the volume flow absorbed by the at least one hydraulic motor (M2) to be accelerated load-free during steps b) and c).

7. Method for the disengagement and engagement of an adjustable hydraulic motor (M1, M2) according to claim 1 by which the displacement of the at least one hydraulic motor (M2) to be engaged is suddenly increased to a level greater than zero after closing of the clutch (K2) by means of deflection of its adjustment device, while the delivery flow of the hydraulic pump (P) is simultaneously increased by the amount of volume flow absorbed by the engaged the at least one hydraulic motor (M2) immediately after deflection.

8. Method for the disengagement and engagement of an adjustable hydraulic motor (M1, M2) according to claim 1 by which the at least one hydraulic motor (M2) is accelerated in such a way that the rotational speed of the clutch input shaft (KEW2), the assigned clutch (K2) being open, is greater than the rotational speed of the clutch output shaft (KAW2) of clutch (K2) and such that during the closing of the clutch (K2) a harmonization of rotational speeds occurs in that the rotational speed of the at least one hydraulic motor (M2) to be engaged is reduced by the clutch (K2) to a synchronizations speed ($n_{syn}$).

9. Method for the disengagement and engagement of an adjustable hydraulic motor (M1, M2) according to claim 1 by which the method for engagement of the at least one hydraulic motor (M2) at an increasing rotational speed ($n_{W3}$) of the shared output shaft (W3) comprises the following steps:
a) Monitoring, of the rotational speed ($n_{W3}$) of the output shaft (W3) of the mechanical drive (MG);
b) Sudden reduction of the displacement of the at least one hydraulic motor (M2) to be disengaged and simultaneous sudden reduction of the delivery flow of the hydraulic pump (P) by the amount of volume flow absorbed by the disengaged the at least one hydraulic motor (M2) immediately before the sudden reduction in displacement volume, when the rotational speed ($n_{w3}$) of the output shaft (W3) exceeds an initial predefined level ($n_{M2A}$);
c) Opening of the clutch (K2), the at least one hydraulic motor (M2) being in a load-free state and its displacement having been adjusted to zero, so that the at least one hydraulic motor (M2) exhibits a reduction in rotational speed due to its internal friction losses.

10. Method for the disengagement and engagement of an adjustable hydraulic motor (M1, M2) according to claim 1 in which the hydraulic motors (M1, M2) exhibit maximum stroke volumes of differing sizes and/or act with a differing transmission ratio on the shared output shaft (W3).

11. Method for the disengagement and engagement of an adjustable hydraulic motor (M1, M2) according to claim 1 in which the clutch (K2) is a synchronized or non-synchronized jaw clutch, a multi-plate clutch or another type of friction clutch.

12. Method for the disengagement and engagement of an adjustable hydraulic motor (M1, M2) according to claim 1 by which the mechanical drive (MG) is a planetary gear, a spur gear or a bevel gear, or a manual or automatic transmission.

13. Control device with a computer program product to execute the method according to claim 1.

* * * * *